Jan. 4, 1955   P. SPURLINO ET AL   2,698,715
MACHINE RELEASE MECHANISM
Filed April 12, 1949   2 Sheets-Sheet 1
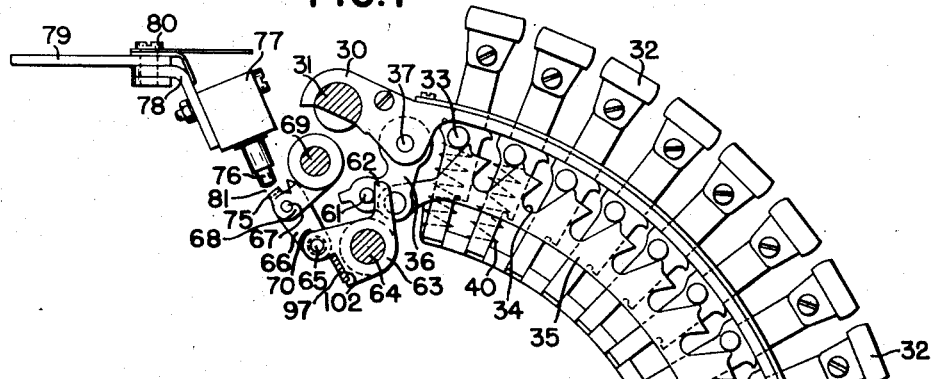
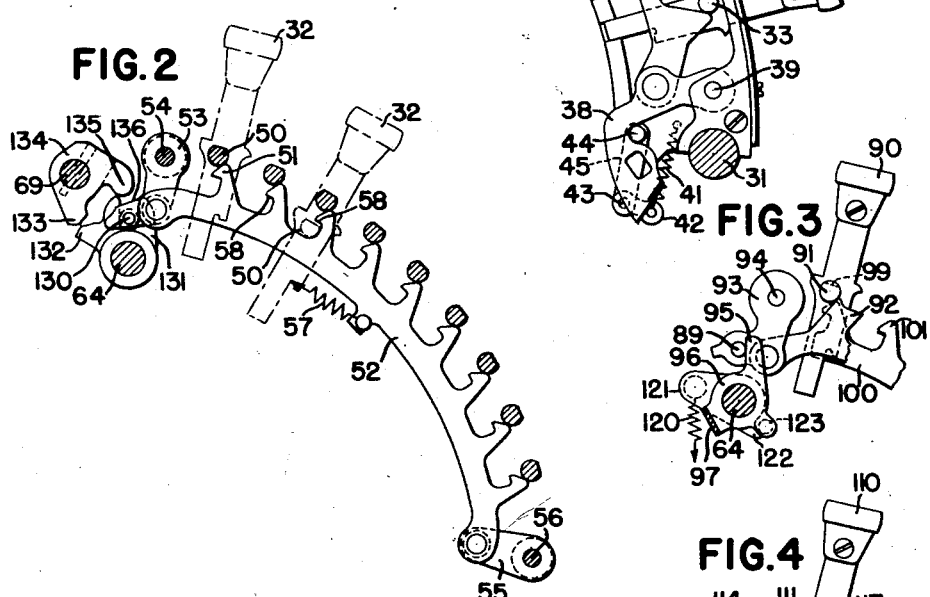
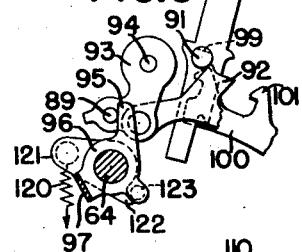
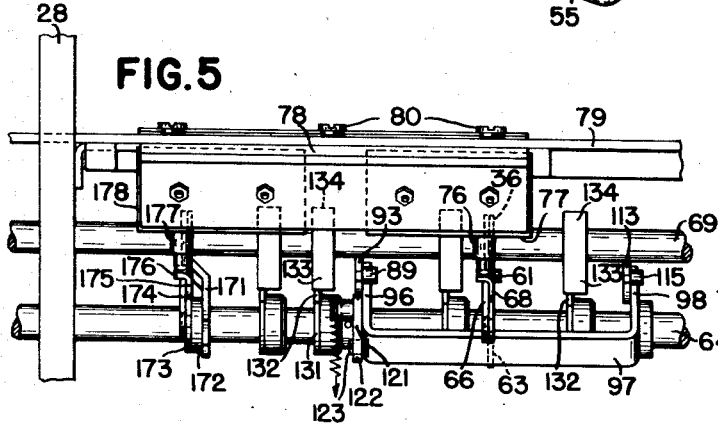
INVENTORS
PASCAL SPURLINO
FRANK B. MOSER
GEORGE L. WHEELER AND
LEONARD STRUVE
BY
THEIR Attorney Jan. 4, 1955
P. SPURLINO ET AL
2,698,715
MACHINE RELEASE MECHANISM
Filed April 12, 1949
2 Sheets-Sheet 2
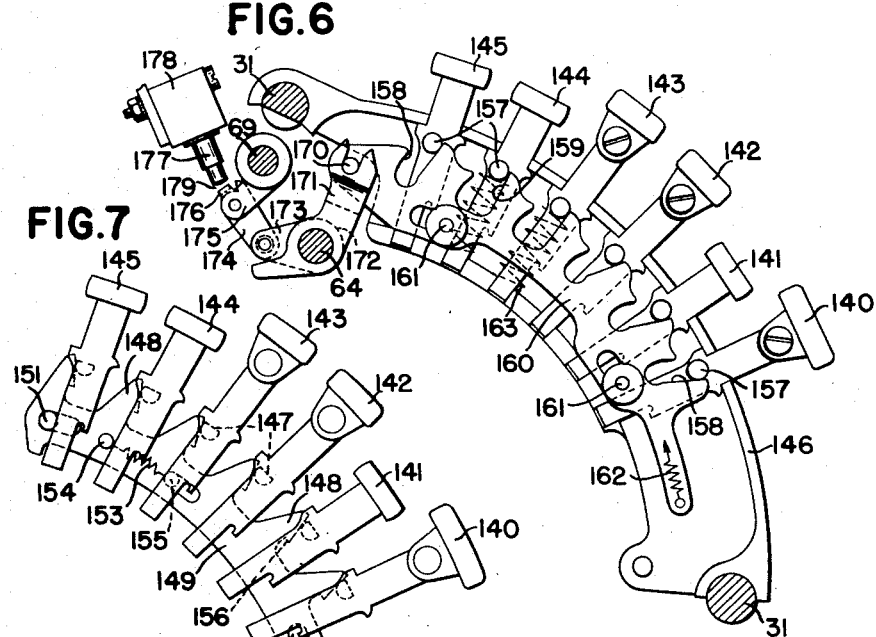
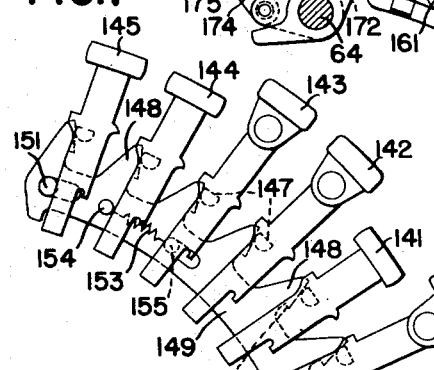
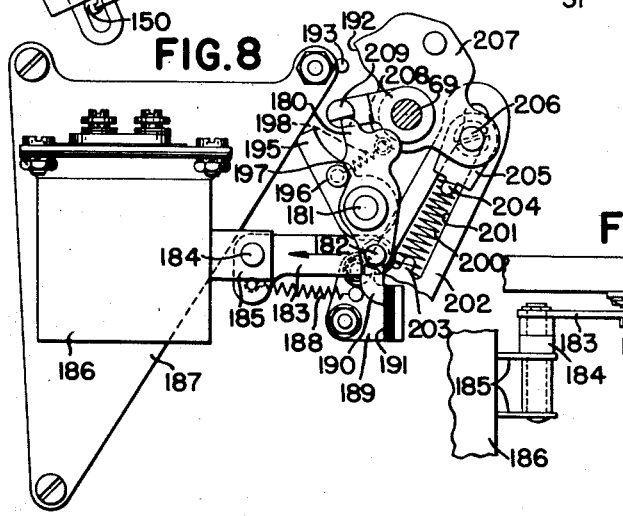
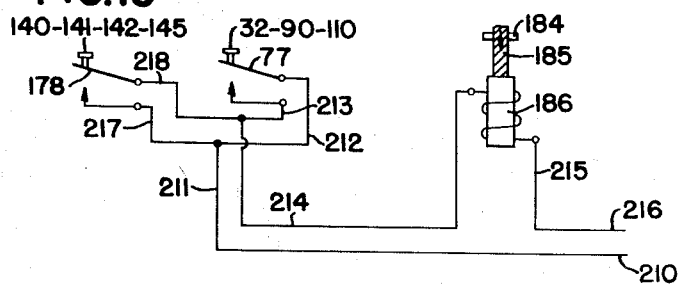
INVENTORS
PASCAL SPURLINO
FRANK B. MOSER
GEORGE L. WHEELER AND
LEONARD STRUVE
BY
THEIR Attorney

United States Patent Office 2,698,715
Patented Jan. 4, 1955

2,698,715

MACHINE RELEASE MECHANISM

Pascal Spurlino, Frank B. Moser, George L. Wheeler, and Leonard Struve, Dayton, Ohio, assignors to The National Cash Register Company, Dayton, Ohio, a corporation of Maryland Application April 12, 1949, Serial No. 87,026

3 Claims. (Cl. 235—62)

This invention relates to accounting machines and similar business machines and is directed particularly to electrically-operated means under control of the controlling keyboard for releasing the machine for operation.

The present invention is embodied in machines of the general type disclosed in the following United States patents, to which reference may be had for a complete showing and description of standard mechanism not fully disclosed herein: United States Patents Nos. 1,619,796; 1,747,397; and 1,761,542, issued, respectively, March 1, 1927; February 18, 1930; and June 3, 1930, to Bernis M. Shipley.

The present invention is particularly adapted to be embodied in machines constructed similarly to those shown in the United States Letters Patent No. 2,375,594, issued on May 8, 1945, to Pascal Spurlino, William M. Carroll, Arthur R. Colley, and Alfred G. Kibler, which patent illustrates and describes a machine commonly referred to as a commercial posting or bank service machine, used by banks and similar institutions for the posting of individual checking accounts.

This invention is also particularly adapted to be used in machines of the type disclosed in the United States Letters Patent No. 2,353,938, issued July 18, 1944, to Pascal Spurlino, Mayo A. Goodbar, and Marvin D. Frost, and also the patent to Everett H. Placke, No. 2,351,541, issued June 13, 1944. These last two mentioned patents illustrate and describe machines known in the art as payroll machines; that is, they are particularly adapted to issue employees' pay checks and keep multiple records of all transactions which relate to employees, including the records of all types of payroll deductions.

The machine disclosed in the Spurlino et al. Patent No. 2,375,594 is provided with a bank of total control keys and two banks of transaction keys, whereas the machines disclosed in the Spurlino et al. Patent No. 2,353,938 and the Placke Patent No. 2,351,541 are provided with a row of total control keys and three rows of transaction keys.

In the present invention, there are illustrated a single row of total control keys, a row of transaction keys complete, and parts of two other rows of transaction keys.

However, the present invention is well adapted to be used with either the commercial bank posting type of machine or the payroll type of machine, and, when used with the commercial bank posting machine, one of the transaction banks is merely omitted.

Certain of the keys in the total control row and the keys in the transaction rows are what are known in the art as operating keys; that is, when those keys are depressed, the machine-releasing mechanism is tripped and the machine goes through its normal cycle of operation.

In such machines, it was necessary to move mechanism by the depression of the key to actually cause the tripping of the machine release mechanism.

In the present invention, this tripping of the machine release mechanism has been improved in that there is provided herein electrical means to operate the machine release tripping means. The electrical means is energized by the depression of any one of the so-called operating keys. Consequently there is a considerably less amount of mechanism to be actually operated by the depression of a key, thus making the key action much easier.

In the present application, it becomes very necessary to make certain that the key which is operated is retained in its depressed position prior to the energization of the electrical means which operates the machine release tripping mechanism.

There is associated with the three rows of transaction keys a microswitch, which is operated upon the depression of any one key of any one of said banks of transaction keys to close the circuit through the electrical device which operates the tripping mechanism for the machine release mechanism. There is also associated with the row of total control keys a microswitch, which is operated upon depression of certain of the keys of this row to complete the circuit through the same electrical device which operates the tripping means for the machine release mechanism.

There is provided a means associated with the three rows of transaction keys whereby, as above mentioned, the depression of a key in any one of the three rows will operate the above-mentioned microswitch.

Therefore, it can be seen that, since the depression of the keys in any of the transaction rows or depression of certain of the keys in the row of total control keys has merely to operate sufficient mechanism to close the microswitch, it requires considerably less pressure and effort on the part of the operator than in the machines of the past, where it was, as above mentioned, necessary to actually move and operate the tripping mechanism for the machine release mechanism.

It is, therefore, an object of the present invention to provide machines of the above-mentioned type with mechanism whereby an easier key action is obtained; that is, a key action in which there are less parts to be operated, and consequently a smaller amount of friction, which makes for less effort on the part of the operator.

It is another object of the present invention to provide electrical means to operate a machine release tripping mechanism by the depression of any one of the machine operating keys.

A still further object of the present invention is to provide electrical means for operating the machine release tripping mechanism and to further provide a switching mechanism in the circuit with said electrical operating means, whereby said switch mechanism is operated upon the depression of one of the operating keys.

A still further object of the present invention is the provision of means in combination with the above-mentioned switching mechanism and electrical mechanisms to insure that the operating key is positively retained in its operating position prior to the time the switch is closed to close the circuit through the electrical means which operates the machine release tripping mechanism.

With these and other incidental objects in view, the invention includes certain novel features of construction and combinations of parts, the essential elements of which are set forth in appended claims, and a preferred form or embodiment of which is hereinafter described with reference to the drawings which accompany and form a part of this specification.

In said drawings:

Fig. 1 is a side elevation of one of the rows of transaction keys showing the switch mechanism associated with this particular row to be closed upon the depression of any one of the keys in this row.

Fig. 2 is a detailed view showing the retaining detent for the keys shown in Fig. 1, so that said keys are retained or locked in their depressed position prior to the time the switching mechanism is closed.

Fig. 3 is a detail of one key of another row of transaction keys and shows mechanism in connection therewith to operate the switching mechanism shown in Fig. 1.

Fig. 4 is a side elevation of a key of still another row of transaction keys showing the mechanism operated thereby, which also operates the switching mechanism shown in Fig. 1.

Fig. 5 is a rear view showing the switch mechanism of Fig. 1 and the means whereby said mechanism is operated by the depression of a key in any one of the rows shown in Figs. 1, 3, and 4, and also shows a switching mechanism which is associated with and operable by certain keys of the total control row.

Fig. 6 is a side elevation of a bank of total control keys and shows the switching mechanism which is operable by the depression of certain of the keys in this bank, said certain keys being known as operating keys.

Fig. 7 is a detail view showing the keys in Fig. 6 and a retaining or locking detent associated therewith, which has for its function to lock any one of said keys in its depressed position.

Fig. 8 shows a portion of the machine-releasing mechanism, the tripping mechanism for said machine-releasing mechanism, and the electrical means which operates said tripping mechanism.

Fig. 9 is a top plan view showing the connections between the machine-releasing solenoid and the machine release shaft tripping means.

Fig. 10 is a wiring diagram showing the circuits through the electrical means which operates the machine release tripping means, and through the switches which are operated by the keys.

GENERAL DESCRIPTION

The invention described in general terms and, embodied in the present application, includes one bank of total control keys with a switch associated therewith which is in circuit with an electrical means operable upon depression of certain of the keys of this control bank to operate a machine release tripping mechanism. The invention also includes a plurality of transaction banks of keys having associated therewith a switching mechanism which is also in circuit with the above-mentioned electrical means, so that the depression of any key in any of the three banks of keys will operate said switch to close the circuit through the electrical device, whereupon the machine release tripping mechanism is operated to release the machine-releasing mechanism.

DETAILED DESCRIPTION

Transaction key banks

Since the transaction keys in all three banks are mounted identically the same, a description of one of the banks, it is believed, will suffice for all. With this in mind, and referring particularly to Figs. 1 and 2, there is shown a key frame 30 mounted on rods 31, carried by machine side frames in exactly the same manner as shown in the above-mentioned patents, and particularly the above-mentioned Shipley Patent No. 1,619,796. The right side frame 28 is partly shown in Fig. 5, and a portion of the left side frame 29 is shown in Fig. 9.

Each key 32 of this transaction bank of keys carries a pin 33, each pin adapted to cooperate with an associated slot 34 of a releasing bar 35 pivoted at its upper end to an arm 36 pivoted at 37 on the key frame 30, and to an arm 38 pivoted at 39 in the key frame 30. Associated with each of the keys 32 is a coil spring 40, which is adapted to hold the keys in their normal undepressed positions, as shown in Fig. 1, in a manner which is well known in the art.

A spring 41, connected to an arm 42, pivoted at 43 on the frame 30, maintains the bar 35 in the position shown in Fig. 1 against the key pins 33 in the normal position of the parts through the medium of a stud 44 carried by an arm 45 secured to the pivot 43, to which is secured the arm 42. This pin 44 engages the under side of the arm 38, and, therefore, the constant pull of the spring 41 tends to rock the arm 38 in a clockwise direction to thereby hold the releasing plate 35 in the position shown.

Each of the keys 32 carries on its opposite side—that is, on the side opposite from the pin 33—a flattened pin 50 (Fig. 2), which cooperates with an angular nose 51 of a retaining detent 52 pivoted at its upper end to an arm 53, which in turn is pivoted at 54 to the key frame 30. The lower end of the retaining detent 52 is pivoted to an arm 55, in turn pivoted at 56 on the key frame 30. A spring 57 normally retains the angular side of the noses 51 against the pins 50.

When one of the keys 32 is moved into its depressed position, shown by dot-and-dash lines in Fig. 2, the pin 50 moves the detent 52 downwardly until said pin passes a shoulder 58 on the bottom of the nose 51, whereupon the spring 57 immediately moves the detent 52 upwardly again, thus latching the key in the depressed position.

When the key 32 is moved into its depressed position, as shown in Fig. 2, and latched in that position, the arm 36 (Fig. 1), by means of a pin 61 carried thereby, contacting a finger 62 of an arm 63 pivoted on a rod 64, rocks said arm 63 in a clockwise direction, as viewed in Fig. 1. The arm 63 also carries another arm 70, having a pin 65, which is connected to a link 66 pivoted at 67 to an arm 68, pivoted on a machine release shaft 69 carried by the machine side frames 28 and 29.

The arm 68 has a bent-over lip 75 (Figs. 1 and 5), adapted to cooperate with a switch plunger 76, which operates a microswitch 77, supported on a bracket 78. The bracket 78 is carried by a machine frame brace 79 and supported by means of screws 80.

When the keys 32 are in their normal undepressed positions, as shown in Fig. 1, there is a clearance, indicated at 81, between the lip 75 and the end of the switch-operating plunger 76.

Upon depression of any one of the keys 32, its pin 33 moves the bar 35 downwardly, whereupon the arm 36 is rocked counter-clockwise (Fig. 1) and the pin 61 rocks the arm 63 clockwise. This causes the link 66 to raise and rock the arm 68 clockwise. While this is occurring, the pin 50 (Fig. 2) is moving the retaining detent 52 downwardly against the tension of the spring 57, and, just as soon as the flattened part of the pin 50 passes beneath the nose 51 and gets beneath the shoulder 58, the spring 57 moves the detent 52 upwardly again into the position shown in Fig. 2, thus retaining the key 32 in its depressed position.

The relations of the parts—that is, the shoulder 58 to the clearance 81 of Fig. 1—are such that the detent 52 latches the key 32 in its depressed position just as the lip 75 touches the end of the switch-actuating plunger 76. At this time, the key is further depressed, whereupon the arm 68 is rocked still farther in a clockwise direction to move the switch plunger upwardly a distance sufficient to close the contacts of this switch 77, which are normally in an open condition. The spring 40 returns the key 32 slightly upwardly until the flat pin 50 contacts the shoulder 58, which retains the key in its depressed position.

When this switch 77 is closed, it completes a circuit through a solenoid, to be hereinafter described, which has for its purpose the function of operating the machine release tripping mechanism, so that, just as soon as one of the keys 32 is completely depressed, the machine-releasing mechanism is released and can function to cause the machine to go through the normal cycle of operation.

Fig. 3 shows one key 90 of another bank of transaction keys, which key 90 has a pin 91 cooperating with a release bar 92, identical with the release bar 35. This release bar is only partly shown but is pivoted at its upper end to an arm 93 pivoted at 94 to a key frame like the key frame 30, shown in Fig. 1. This arm 93 carries a pin 89 cooperating with a finger 95 of an arm 96 pivoted on the shaft 64. This arm 96 is integral with a bail 97, which is also integral with an arm 98 (Fig. 5) pivoted on the rod 64.

This bank of keys 90 has a flattened pin 99 (Fig. 3), having associated therewith a detent 100, having latching noses 101 exactly like the detent 52 shown in Fig. 2, and operates to retain the keys 90 in their depressed positions in identically the same manner as the detent 52 retains the keys 32 in their depressed positions. Consequently, when one of the keys 90 is depressed, the pin 91, by moving the release bar 92 to the right (Fig. 3), rocks the arm 93 counterclockwise, whereupon the pin 89 rocks the arm 96 in a clockwise direction, thus moving the bail 97 upwardly, as viewed in Figs. 1 and 3.

This bail 97, as shown in Fig. 1, engages a notch or groove 102 of the arm 63. Thus, whenever the key 90 is depressed to rock the arm 96 clockwise, the bail 97 causes a clockwise movement of the arm 63, whereupon the link 66 is raised, thus rocking the arm 68 clockwise, so that its lip 75 moves the plunger 76 upwardly, thus closing the microswitch 77 in identically the same manner as is done by the depression of the key 32. A depressed key 90 is locked in depressed position by the latching nose 101 prior to the time the microswitch 77 is operated to close the circuit through the electrical means which operates the machine release tripping means.

In Fig. 4 is shown a key 110 of another row of transaction keys, which key carries a pin 111 cooperating with a release bar 112, pivoted to an arm 113, in turn pivoted at 114 to a key frame identical with the key frame 30, shown in Fig. 1. This arm 113 carries a pin 115, cooperating with a finger 116 of the arm 98, previously described, and to which is connected the previously-described bail 97.

Consequently, depression of this key or any of the keys 110 in said transaction bank of keys, through the bar 112, the arm 113, and the pin 115, rocks the arm 98 clockwise, thus raising the bail 97 in identically the same manner as was done by depression of the key 90, whereupon the arm 63 is rocked clockwise to raise the link 66 and rock the arm 68 so that its lip 75 raises the switch plunger 76 to close the contacts of the microswitch 77.

Each key 110 carries a flattened pin 117 cooperating with a latching nose 118 of a retaining detent 119, identical with the detent 52 shown in Fig. 2, and operating in identically the same manner to retain any of the depressed keys 110 in depressed position prior to the time the plunger 76 closes the switch 77.

The fingers 62, 95, and 116 are maintained in contact with their respective pins 61, 89, and 115 by means of a spring 120 (Fig. 3) connected to an arm 121, which is pivoted on the rod 64. This arm 121 has a finger 122 contacting a pin 123, carried by the arm 96, and consequently pressure of the spring 120 tends to rock the arm 96 counter-clockwise to retain its finger 95 against its associated pin 89, whereupon the bail 97, being connected to the arms 63 and 98, also holds their respective fingers 62 and 116 normally in contact with their associated pins 61 and 115.

An interlock is provided to prevent release of the machine if any of the control keys 32 are only partially depressed, or to prevent depression of any of the control keys after the machine has been released. This mechanism will now be described.

The arm 53, which supports the upper end of the detent 52, carries a pin 130, which projects into a forked arm 131, loose on the rod 64. The arm 131 has a finger 132, which, when a key 32 is partially depressed and the detent 52 is moved downwardly thereby, will be raised into the path of a finger 133 of an arm 134, which is secured to the machine release shaft 69. It, therefore, can be seen that, when one of the keys 32 is depressed only part way, the arm 131 will be rocked clockwise by the pin 130 to a position in which the finger 132 will obstruct movement of the arm 134, which will therefore prevent release of the machine while the parts remain in this position. If the key 32 is fully depressed, however, the detent 52 returns to its normal position, as has been previously described, and the finger 132 of the arm 131 is rocked counter-clockwise out of the path of the finger 133. Therefore there will be no obstruction to the movement of this arm 134, and the releasing movement of the release shaft 69 can take place. There is one of the arms 131, together with its corresponding finger 133, cooperating with each of the banks of keys 32, 90, and 110.

It is also apparent from Fig. 2 that, when the machine is released and the shaft 69 is rocked counter-clockwise, the finger 133 will also be rocked into the path of the finger 132 of the arm 131, and therefore it will be impossible to depress any of the control keys 32 and the detent 52 will be locked against movement until such time as the release shaft 69 is restored to its normal position. This is also true in connection with the keys 90 and 110.

Near the end of the operation of the machine, the detent 52 is moved downwardly to release any of the depressed keys 32 by engagement of a finger 135 with a horizontal portion 136 of the arm 53, upon restoring movement of the shaft 69, to which said arm 134 is secured.

The above-mentioned releasing movement of the shaft 69 also releases any of the keys 90 or 110 which have been previously depressed near the end of the operation of the machine.

From the above description, it will be clear that, whenever any one of the keys 32, 90, or 110 is depressed in its respective bank, it causes the microswitch 77 to be closed, which in turn closes a circuit through an electrical mechanism to be hereinafter described, to operate a machine release shaft tripping means, so that the machine release shaft 69 can be operated in the manner to be hereinafter described, to cause the machine to go through a normal cycle of operation.

The total control key bank and its associated mechanism will now be described.

In this control bank there are six control keys 140, 141, 142, 143, 144, and 145 (Figs. 6 and 7), which are slidably mounted in a key frame 146, in turn supported on the previously-described rods 31. Each of the keys has a flattened stud 147 cooperating with the angular face of a nose 148 on a retaining detent 149, which is slidably mounted on pins 150 and 151, which are carried by the key frame 146. The angular faces of the noses 148 are normally held in contact with the pins 147 by a spring 153, which is connected to a pin 154, carried on the detent 149, and a pin 155 mounted in the frame 146.

Whenever any one of the keys 140 to 145 is depressed, its pin 147 moves the detent 149 upwardly, as viewed in Fig. 7, until the flattened portion of the pin is below a surface 156 of the nose 148, whereupon the spring 153 again moves the detent back to the position shown in Fig. 7, thus retaining the depressed key in its depressed position.

Each of the keys 140 to 145 inclusive has a pin 157 (Fig. 6). The pins 157 of the keys 140, 141, 142, and 145 cooperate with angular slots 158, and the pins 157 of the keys 143 and 144 cooperate with straight-sided slots 159 of an operating bar 160, slidably mounted on pins 161, supported by the key frame 146. A spring 162 normally holds the right sides of the slots 158 and 159 against the pins 157 of the keys 140 to 145. All of these keys 140 to 145 inclusive are maintained in their normal positions by means of compression springs 163, one of which is associated with each of the keys. These springs function in the normal way, which is well known in the art.

The operating bar 160 carries a pin 170, which is engaged by a forked arm 171 pivoted on the rod 64. Connecting the arm 171 by means of a hub 172 is an arm 173, which is connected by a link 174 to an arm 175, pivoted on the release shaft 69. The arm 175 has a formed-over lip 176 adapted to cooperate with a plunger 177, which operates the contacts of a microswitch 178 in a manner to be hereinafter described.

Whenever any one of the keys 140, 141, 142, or 145 is depressed, its downward movement causes its pin 157 to move the control bar 160 downwardly, thus rocking the arm 171 and also the arm 173 in a clockwise direction, whereupon the link 174 rocks the arm 175 clockwise and causes the lip 176 to engage and move the plunger 177 upwardly to close the contacts of the microswitch 178, the purpose of which will be hereinafter described.

Whenever any one of the keys 143 or 144 is depressed, due to the fact that the slots 159, which cooperate with the pins 157 of these two keys, are straight, the depression of either of these keys consequently does not move the bar 160, and consequently the microswitch plunger 177 is not operated.

This microswitch is in circuit with the above-mentioned electrical device, to be later described, which is for the purpose of operating the machine release shaft tripping means.

The clearance 179 (Fig. 6) between the lip 176 and the end of the plunger 177 is sufficient to permit the depressed key 140 to 142 and 145 to have its stud 147 below the shoulder 156 of the nose 148 of the retaining detent 149, so that the key will be positively locked in its depressed position before the plunger 177 is moved a distance inwardly sufficient to close the contacts of the microswitch 178 in identically the same manner as was described in connection with the lip 75 and the plunger 76, which are associated with and operated by the three banks of keys 32, 90, and 110.

In Fig. 8 there are shown the machine release shaft, a part of the mechanism for rocking it in a counter-clockwise direction to release the machine, the machine release shaft tripping mechanism, and the electrical device which operates said machine release shaft tripping mechanism.

The means for restoring the shaft 69 to its normal position is not shown herein but is identical with that mechanism which is fully illustrated and described in the above-mentioned Shipley Patent No. 1,619,796, and, if a description thereof is desired, reference may be had to that patent for the same.

The machine release shaft 69 (Fig. 8) is adapted to be moved in a counter-clockwise direction by a strong spring 200, mounted in a slot 201 of a link 202 in exactly the same manner as is fully illustrated and described in the above-mentioned Shipley Patent No. 1,619,796. The spring 200 sits on a finger 203 of the link 202 and also engages fingers 204 of arms 205 (only one arm being shown), which arms are mounted on each side of the link 202. A stud 206, carried by the arms 205, projects into an arm 207, which is secured to the machine release shaft 69. Also secured on the machine release shaft 69 is an arm 208, carrying a flat-sided pin 209.

The shaft 69 is held in its normal position by the upper end of a trip lever 180, which is engaged by the flattened pin 209 and held in such engagement by the spring 200. This tripping lever 180 is pivoted on a stud 181, carried by the left side frame 29.

It might be stated here that the link 202 and the arm 207 are mounted adjacent the right side frame 28 of the machine in their normal positions, as shown in Fig. 5.

The tripping lever 180 carries a stud 182, by means of which said tripping lever 180 is connected to a link 183. This link 183 is connected by means of a long stud 184 (Fig. 9) to a solenoid core 185 of a solenoid 186 mounted on a bracket 187, secured to the left side frame 29. A spring 188, connected to the link 183 and to a bracket 189, secured to the left side frame, normally maintains the parts in the positions shown in Fig. 8, whereupon the upper end of the tripping lever 180 is beneath the flat stud 209 of the arm 208, which, it will be remembered, is secured to the machine release shaft 69. A finger 190 on the lower end of the tripping lever 180 is normally held by the spring 188 in contact with a resilient sound-deadening material 191, secured to the bracket 189.

By means to be hereinafter described, the solenoid core 185 is moved to the left, as viewed in Fig. 8, in the direction of the arrow, thus pulling the link 193 in the same direction, which rocks the tripping lever 180 clockwise, removing its upper end from beneath the flattened pin 209, whereupon the strong spring 200, through the medium of the pin 206 and the arm 207, rocks the machine release shaft 69 in a counterclockwise direction until a surface 192 of the arm 207 contacts a limiting pin 193, carried by the machine right side frame 28.

Such movement of the machine release shaft 69, as has been clearly illustrated and described in the above-mentioned Shipley Patent No. 1,619,796, closes a circuit through the machine-operating motor, thus driving the machine through a normal cycle of operation.

The solenoid 186 is energized upon the closing of either the microswitch 77 (Figs. 1 and 5) or the microswitch 178 (Figs. 5 and 6) upon the depression of any of the keys shown in Figs. 2, 3, and 4, and upon depression of certain of the keys shown in Fig. 6, respectively. As will be remembered, four of the keys— namely, 140, 141, 142, and 145 of Fig. 6—operate the microswitch plunger 177 to close the contacts in the microswitch 178, and a depression of any one of the keys 32 (Fig. 1), 90 (Fig. 3), and 110 (Fig. 4) operates the microswitch plunger 76 to close the contacts of the microswitch 77.

In order to prevent an operator from either accidentally or intentionally holding down any one of the above-mentioned operating keys and thus causing an immediate second operation of the machine, there is provided a usual non-repeat pawl 195 (Fig. 8), which is pivoted on the stud 181, and having a stud 196 held in contact with a surface 197 of the tripping lever 180 by means of a spring 198.

The pawl 195 is slightly higher than the upper end of the tripping lever 180, and consequently, when the pin 209 is released by the tripping lever 180 and moved downwardly under tension of the spring 200, it is moved downwardly to the left of the tripping lever 180 and to the right of the non-repeat pawl 195, thus holding the tripping lever 180 in its released position at the end of the operation of the machine, and until after the arm 208 is restored clockwise to a position slightly above that shown, and then finally restored to the position shown in Fig. 8. At the time the arm 208 is slightly above the position shown, the circuit through the solenoid is broken, and consequently the spring 188 can restore the solenoid core 185 and the link 183 to the right, to the position shown, thus moving the tripping lever 180 to the position shown, so that, when the arm 208 finally assumes the position shown, the flattened pin 209 will be directly above the upper end of the tripping lever 180.

Circuits

The circuits for energizing the solenoid 186, under control of the keys 32, 90, 110, 140, 141, 142, and 145, are shown in Fig. 10.

When any one of the keys 32, 90, or 110 is depressed and latched in its depressed position, in the manner above described, it operates the plunger 76, which closes the circuit through the microswitch 77, thus completing a circuit as follows:

From one side 210 of the source of supply, through line 211, line 212, closed microswitch 77, line 213 to line 214, through the solenoid 186, line 215 to the opposite side of the line at point 216, thus energizing the solenoid 186, whereupon the core 185 is moved to the left as viewed in Fig. 8, for the purposes above described.

When any one of the keys 140, 141, 142, or 145 is depressed, it in the manner above described operates the plunger 177 (Fig. 6) to close the circuit in the microswitch 178, thus completing a circuit as follows:

From the point 210 of the supply, through line 211, line 217, closed microswitch 178, line 218, thence through line 214, through the solenoid 186, through line 215, the opposite side of the line 216, thus energizing the solenoid 186, whereupon its core 185 is moved to the left, as viewed in Fig. 8, to cause the tripping of the machine release shaft 69 in the manner previously described.

Since the operation of all the mechanism in connection with the tripping of the machine release shaft 69 by the electrical means under control of the various control keys 32, 90, 110, 140, 141, 142, and 145 has been described in detail, it is not thought necessary to go into a further description of an operation of the machine at this point. It is believed that the above detailed description clearly sets forth all of the operating cooperations of the various elements to obtain the desired results.

While the form of mechanism herein shown and described is admirably adapted to fulfill the objects primarily stated, it is to be understood that it is not intended to confine the invention to the one form or embodiment herein disclosed, for it is susceptible of embodiment in various forms.

What is claimed is:

1. In a machine of the class described, the combination of a machine releasing means, including an arm movable therewith; a normally restrained power member adapted when released to operate said machine releasing means; a tripping lever cooperating with said arm to retain said power member and said releasing means normally ineffective; a solenoid connected directly to said tripping lever, and adapted, when energized, to actuate said tripping lever to release said arm and said power member to cause operation of the machine releasing means; a normally open switch, adapted when closed, to cause energization of said solenoid; a plurality of banks of manipulative means; a plurality of rockable devices, one associated with each of said banks of manipulative means and operable by any of said manipulative means; means to close said switch; and means common to all of said rockable devices and operable by any one of them to actuate said switch-closing means upon operation of any of said manipulative means.

2. In a machine of the class described, the combination of a machine release rock shaft; a normally restrained power member adapted when released to operate said rock shaft to release the machine; an arm secured to said rock shaft; a tripping member normally in the path of movement of said arm and engaged by said arm to restrain said power member; a plurality of banks of depressible keys; electrical means connected directly to said tripping member and adapted when operated to actuate the tripping member to move it away from said arm to free the power member; an operating circuit for said electrical means including a normally open switch; a plurality of devices, one associated with each of said banks of depressible keys and being operable by any key in its respective bank; a plurality of fingered members, one associated with each of said devices and being operable thereby; a switch-operating means connected to one of said fingered members and operable thereby to actuate said switch to complete the circuit for said electrical means; and means connecting said one fingered member to the remaining fingered members to cause operation of any of said remaining fingered members to actuate said one fingered member to operate the switch to enable a completion of said circuit by operation of any of said plurality of devices.

3. In a machine of the class described, the combination of a machine releasing mechanism, including an arm secured to a rock shaft; a normally restrained power member adapted when released to operate said rock shaft to release the machine; tripping means normally contacted by said arm to restrain said power member and retain said releasing mechanism in an ineffective position; a plurality of banks of depressible keys; electrical means connected directly to said tripping means and adapted when operated to move the tripping means away from said arm to free said power member; an operating circuit for said electrical means including a normally-open switch; a retaining device associated with each bank of keys and adapted to retain any depressed key in its respective bank in depressed position; a rockable member associated with each of said banks of keys and operable by any key in its respective bank; a member operable to close said switch to complete the circuit for said electrical means after the operated key is retained in its depressed position; and means to actuate said switch operating member upon operation of any one of said rockable members, said actuating means including a plurality of pivoted arms, a link member connected to one of said pivoted arms and said switch operating member, and a bar connected to all of said pivoted arms, there being a pivoted arm contacted and operated by each of said associated rockable members.

References Cited in the file of this patent

UNITED STATES PATENTS

| Number | Name | Date |
|---|---|---|
| 910,690 | Kettering | Jan. 26, 1909 |
| 1,619,796 | Shipley | Mar. 1, 1927 |
| 1,808,213 | Eichenauer | June 2, 1931 |
| 1,849,169 | Britten | Mar. 15, 1932 |
| 1,877,802 | Britten | Sept. 20, 1932 |
| 2,117,620 | Mathi | May 17, 1938 |
| 2,552,789 | Hopkins | May 15, 1951 |
| 2,654,539 | Brubaker et al. | Oct. 6, 1953 |